MODULATING AND TRANSMITTING APPARATUS

Filed April 10, 1947

INVENTORS
DAVID E. KENYON
HIRSTLE M. HAMMOND
BY Paul B. Hunter
ATTORNEY

INVENTORS
DAVID E. KENYON
HIRSTLE M. HAMMOND
BY Paul B. Hunter
ATTORNEY

July 1, 1952 D. E. KENYON ET AL 2,602,136

MODULATING AND TRANSMITTING APPARATUS

Filed April 10, 1947 4 Sheets-Sheet 3

INVENTORS
DAVID E. KENYON
HIRSTLE M. HAMMOND
BY
Paul B. Hunter
ATTORNEY

July 1, 1952 D. E. KENYON ET AL 2,602,136

MODULATING AND TRANSMITTING APPARATUS

Filed April 10, 1947 4 Sheets-Sheet 4

INVENTORS
DAVID E. KENYON
HIRSTLE M. HAMMOND
BY Paul B. Hunter
ATTORNEY

Patented July 1, 1952 2,602,136

UNITED STATES PATENT OFFICE 2,602,136

MODULATING AND TRANSMITTING APPARATUS

David E. Kenyon, Cold Spring Harbor, and Hirstle M. Hammond, Williston Park, N. Y., assignors to The Sperry Corporation, a corporation of Delaware Application April 10, 1947, Serial No. 740,692

17 Claims. (Cl. 250—17)

This invention relates to modulating methods and apparatus, and more particularly to methods and apparatus adapted to generate and transmit signals having predetermined recurrent frequency sequences.

This invention relates to copending application No. 740,693, in the name of David E. Kenyon, filed April 10, 1947 for a radio beacon navigation system and discloses herein transmitting and modulating methods and means adapted to be used with such a system.

The present invention is directed towards providing novel modulating and transmitting means, for such a beacon system, which are capable of generating and transmitting signals characterized by predetermined recurrent frequency sequences, said signals being adapted to be received by panoramic receivers.

Accordingly the principal object of the invention is to transmit signals, characterized by predetermined recurrent frequency sequences, which are adapted to be received by panoramic receiving means.

Another object of the invention is to provide modulating means adapted to produce said frequency sequences.

Another object of the invention is to provide means to automatically transmit modulations representing recurrents codes of any two or three letter combination of dots and dashes.

Another object of the invention is to automatically transmit signals having predetermined frequency sequences representing any desired identification signal in dots or dashes.

The invention will be more fully explained in connection with the following figures wherein.

Figure 1:
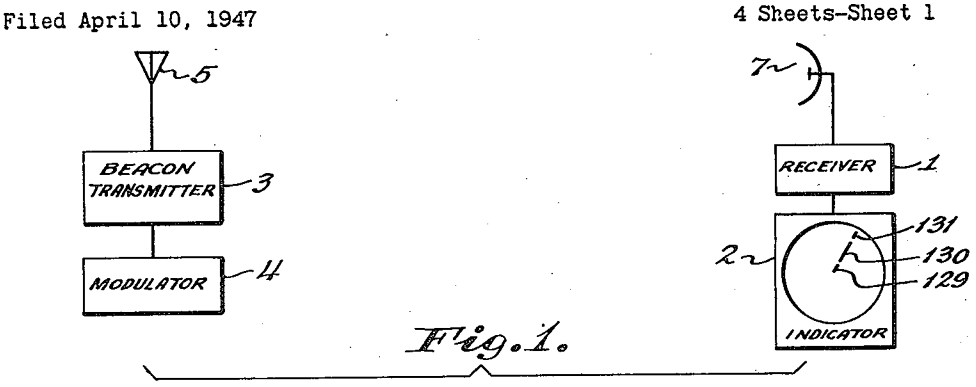
Fig. 1 is a schematic diagram illustrative of a system adapted to use the invention.

Referring to Fig. 1 there is shown a beacon transmitting station apparatus and the craft receiving apparatus. The beacon station comprises a transmitter 3, operably connected to a modulator 4, and to an omnidirectional antenna 5. The transmitter may be low or medium power, for instance, in the microwave frequency band, a klystron tube may be used as the power oscillator. The modulator 4 is adapted to frequency modulate the carrier frequency of transmitter 3 proportionally to a coded identification signal, which may be for purposes of illustration a letter in conventional Morse code. The omnidirectional antenna 5 may be a simple dipole for high frequency operation, and it should be mounted high enough to provide a desirable line of sight range.

The craft radio beacon receiving means comprises a beacon receiver 1, operatively connected to a directional antenna 7, which is adapted to be rotated, and an indicating means 2 operably connected to the output of a beacon receiver 1.

The beacon receiver 1 is of the panoramic type, that is, its frequency is adapted to be periodically swept through a frequency band. A preferred form of the indicating means 2' may be a cathode ray tube of the type using plan position (PPI) indication. The indicator 2 sweep voltage is synchronized with the panoramic sweep voltage of the beacon receiver 1.

As previously mentioned, the beacon transmitter 3 may be frequency modulated by identification signals which may be single letters consisting of dots and dashes. As the craft directional antenna 7 is pointed towards the beacon transmitter 3, it is desired that the beacon receiver 1 shall receive these dots and dashes and present them visually on the indicator 2 as shown in Fig. 1.

The directional part of this indication is automatically taken care of by the indicator sweep voltage rotating in azimuth in synchronism with the azimuthal rotation of the directional antenna 7 in a manner similar to existing radar systems. The identification part of this indication, that is, the formation of the dots and dashes 129, 130 and 131 on the indicator 2 will be more fully explained in connection with Fig. 2.

Figure 2:
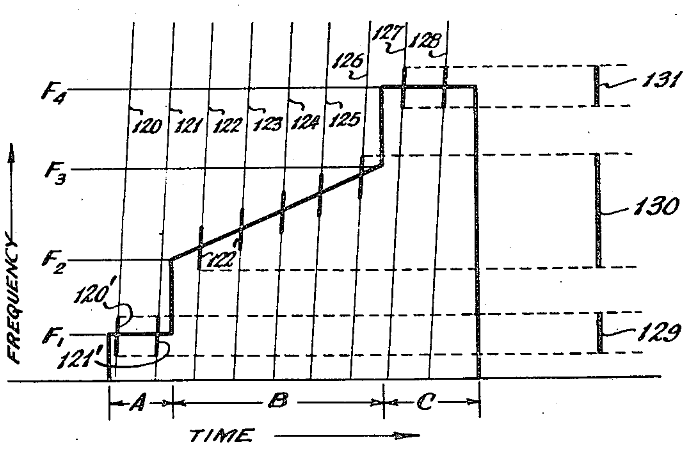
Fig. 2 is a chart illustrative of the principles of the invention.

Fig. 2 shows a typical beacon frequency modulated transmission plotted against time. Thus, it is seen that the beacon transmitter 3 transmits a frequency of $F_1$ for a certain time in portion A of the wave form; sharply jumps to $F_2$ and then gradually changes its frequency to $F_3$, in portion B of the wave form; jumps to frequency $F_4$, and then transmits $F_4$ for a certain time, in portion C of the wave form, this sequence being continuously repeated. The lines 120, 121 and 122, etc., represent the frequency excursions of the panoramic receiver 1 plotted against time. Thus, as the receiver frequency increases along line 120, it receives a response to the frequency $F_1$ which is then being transmitted by the beacon. The length of time of reception indicated by the heavy line 120' is determined generally by the I. F. bandwidth of the receiver.

On the next frequency excursion of the receiver, represented by line 121, a similar response to frequency $F_1$, as indicated by the heavy line 121', is received. Responses 120' and 121' coincide in frequency and produce a short signal 129 or a "dot" on the cathode ray indicator screen. The next frequency excursion, indicated by line 122, receives a response 122' at some frequency between $F_2$ and $F_3$. The following four excursions, indicated by lines 123, 124, 125 and 126, all receive responses between $F_2$ and $F_3$, and it is noted that these responses overlap, producing a long continuous signal, or a "dash" 130 on the persistent cathode ray screen. The next two frequency excursions indicated by lines 127 and 128 receive responses at frequency $F_4$, which responses coincide to produce signal 131.

Therefore, it is seen that the visual response indicated along the radial sweep trace of the cathode ray indicator 10 will be as indicated by signals 129, 130 and 131—dot, a dash and a dot—thereby identifying the beacon. There is no synchronism between the repetition rate of the frequency modulated beacon transmission and the repetition rate of the receiver frequency excursions. In a preferred embodiment of the invention it is desirable that the receiver repetition rate be many times that of the transmitter repetition rate. It is also desirable to separate the transmitted frequencies, namely, $F_1$ from $F_2$ and $F_3$ from $F_4$ so that there will be adequate spacing between the visual signals.

Figure 3:
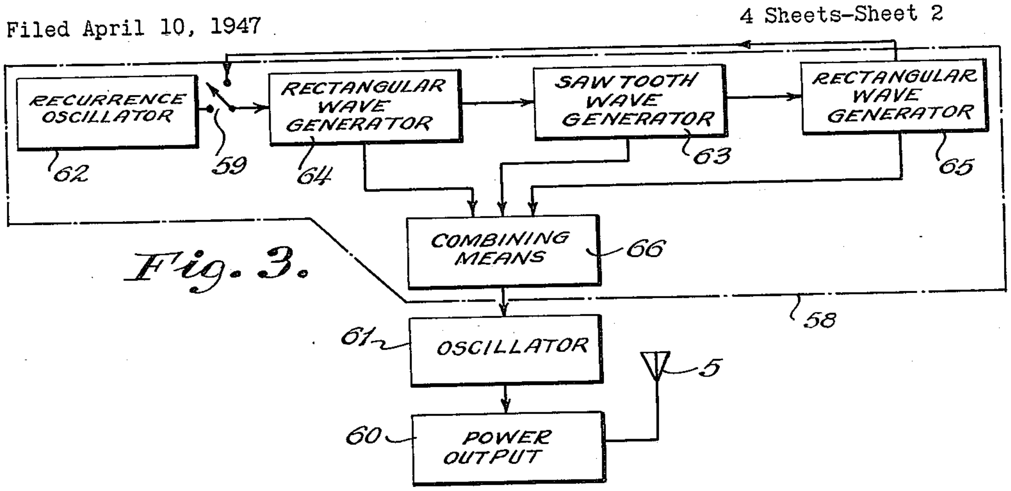
Fig. 3 is a block schematic diagram of an embodiment of the invention.

Fig. 3 illustrates a schematic block diagram of an embodiment of a beacon transmitter comprising antenna 5, a power output stage 60 operatively connected to an oscillator stage 61 which in turn is operably connected to modulator 58 wave forming circuits. These wave forming circuits perform the function of providing the coded wave form modulation, that is, providing a wave form such as that illustrated in Fig. 2. The wave forming operations may be performed as taught by the invention by suitable combinations of oscillators, rectangular wave generators and sawtooth wave generators. Thus, the complex wave form of Fig. 2 may be broken down as follows; portion A is a rectangular wave of low amplitude, portion B comprises a sawtooth wave plus a rectangular wave of a higher average level, and portion C, a rectangular wave having a still higher average level. Each portion of the complex wave is generated by one of the separate generators and their outputs are combined together in the desired sequence by combining means 66 and then applied to modulator 61.

The separate wave forming circuits illustrated in Fig. 3 comprise a rectangular wave generator 64, operable to provide portion A of the wave form; a sawtooth voltage generator 63 to provide the sloping part, that is, portion B, of the wave form; and another rectangular wave generator 65 to form the portion C. One of the rectangular wave generators should be a free running multivibrator to initiate the cycle. Each of the three wave forming generators is arranged to be triggered at the conclusion of the preceding portion of the wave form, and form a closed chain in one position of switch 59.

The sequence of the operations will now be considered. Assuming that rectangular wave generator 64 is a free running multivibrator, it initiates the cycle, forms portion A of the wave form, and at the conclusion thereof, triggers sawtooth generator 63. Sawtooth generator 63 forms portion B of the wave form and at the completion thereof, triggers rectangular wave generator 65 which forms portion C. At the conclusion of portion C of the wave form, a trigger is supplied to rectangular wave generator 64 through switch 59, causing it to initiate a new cycle prematurely, that is, before the associated time constants will allow such in a free running state. Thus, one of the wave forming circuits must be a free running multivibrator to initiate the first cycle, although it becomes a triggered multivibrator for succeeding cycles.

A separate recurrence oscillator 62 might be used through the other position of switch 59, solely to control the repetition frequency, but it is not necessary, if one of the wave forming circuits is a free running oscillator.

Figure 4:
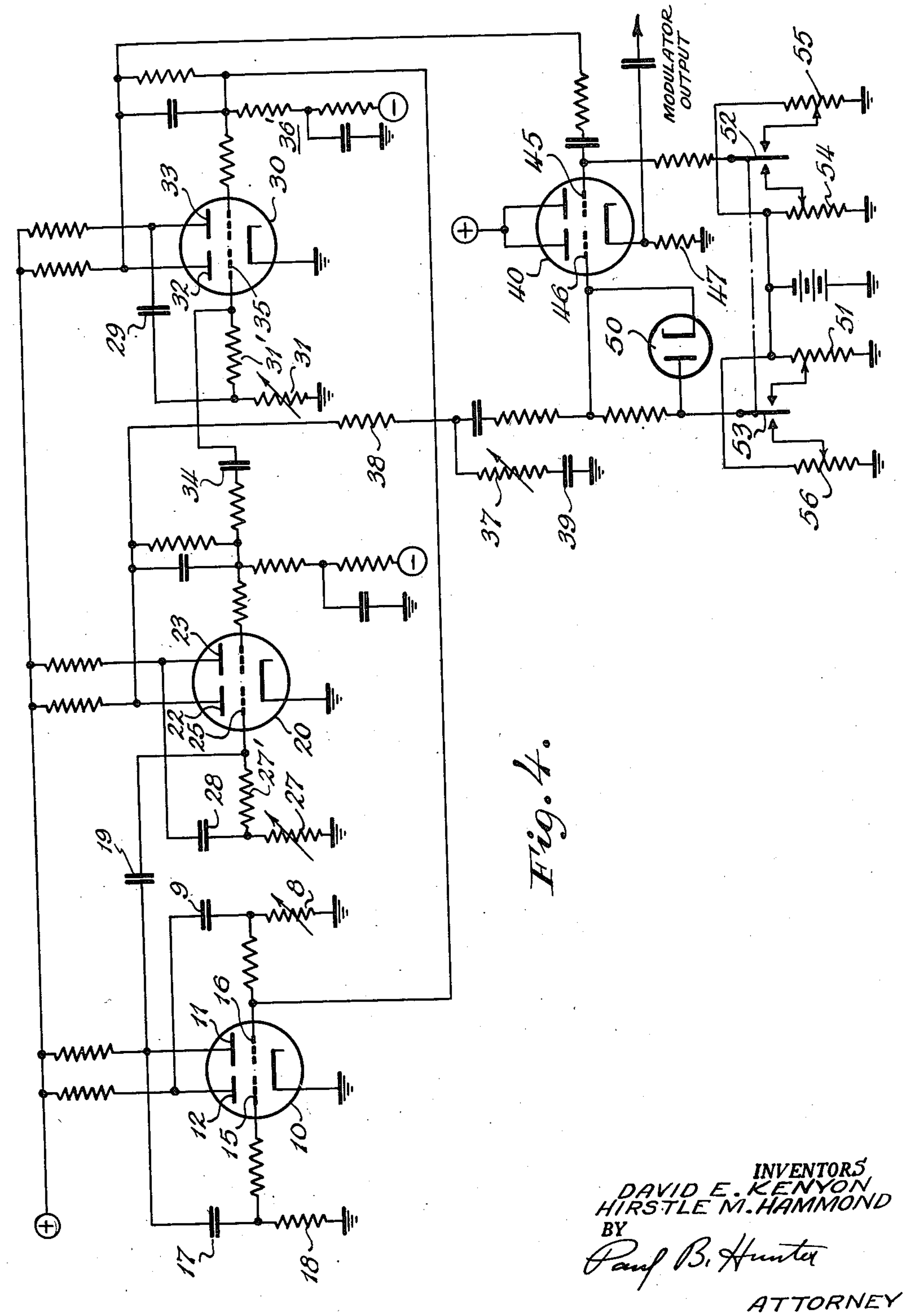
Fig. 4 is a schematic diagram of a novel modulator used in the invention.

Fig. 4 is a schematic diagram of an embodiment of the modulator 58 circuit adjusted for generation of an "R" or dot-dash-dot code. Referring to the sketch, the circuit of vacuum tube 10 is a self-oscillating type of multivibrator; tube 20 and tube 30 circuits are "one shot" multivibrators, that is, must be triggered each cycle; tube 40 is a cathode follower and mixer, and tube 50 is a D. C. restorer.

Figure 5:
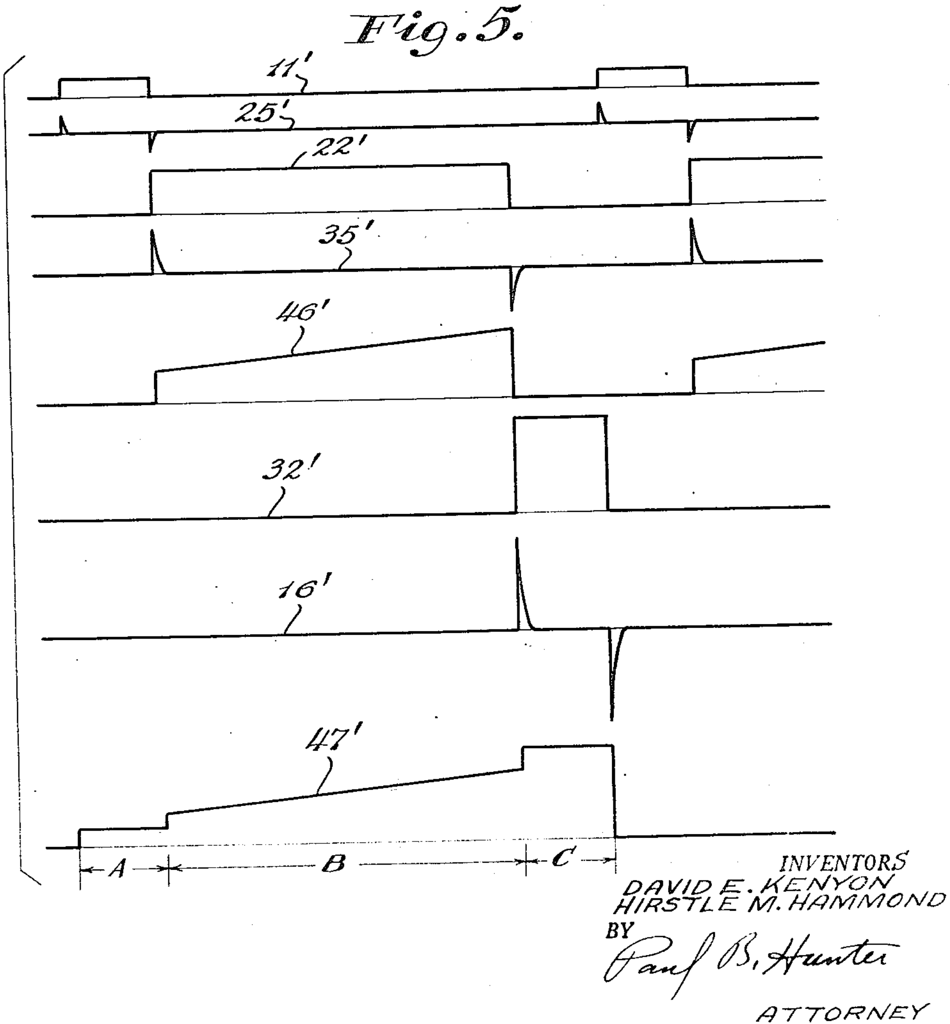
Fig. 5 represents wave forms illustrative of the operation of the embodiment of Fig. 4.

The sequence of operations may be described by, referring to the wave forms of Fig. 5 which each have the same number, plus a prime mark, as the circuit component where they occur, for instance, plate 11 has a wave form 11'.

Assume that plate 11 of free running multivibrator tube 10 is conducting, plate 12 is not conducting, as grid 15 is held below cutoff by a charge on capacitor 17. When capacitor 17 discharges sufficiently through resistor 18 to reach the cutoff voltage level of grid 15, plate 12 of tube 10 conducts and grid 16 is driven below cutoff. This results by well known multivibrator action, in a square voltage wave on plate 11, shown as wave form 11' of Fig. 5, the duration of the positive portion of which is determined by the time constant of resistor 8 and capacitor 9. In a specific embodiment where resistor 8 is equal to 1 megohm and condenser 9 to .002 microfarads, it will take approximately 3500 microseconds for grid 16 to rise to cutoff level as condenser 9 must charge from −260 volts toward +40 volts and cutoff is reached at −12 volts bias.

The resistor 18, capacitor 17 time constant is chosen large to hold grid 15 cutoff for the remainder of the modulation cycle. The square wave 11' is then differentiated by condenser 19 and resistors 27 and 27' thus producing a wave form 25' illustrated in Fig. 5 which is then applied to grid 25 of tube 20, which grid is normally at zero bias. The negative pip corresponding to the negative going edge of square wave 11' drives grid 25 below cutoff momentarily, and plate 22 of tube 20 therefore stops conducting, giving rise to a square wave 22', the positive duration of which is determined by the time constant of resistor 27 and capacitor 28. For purposes of illustration in a specific application, if resistor 27 is equal to one megohm and condenser 28 is equal to .008 microfarads, it will take approximately 13,000 microseconds for grid 25 to rise to cutoff potential since it must rise exponentially from −260 volts to +40 volts.

This square wave 22' of Fig. 5 is differentiated by the differentiating circuit comprising condenser 34 and resistors 31 and 31' thereby producing wave form 35' which is applied to grid 35 of tube 30 which is normally at zero bias, and the negative pip corresponding to the negative going edge of square wave 22' causes grid 35 to be driven momentarily below cutoff. This results in a square wave 32' occurring at plate 32, the positive duration of which is determined by the time constant of resistor 31 and capacitor 29. This time constant has been chosen for illustration to be equal to that of capacitor 9 and resistor 8. Therefore, the positive portion of square wave 32′ is equal to that of square wave 11 or approximately 3500 microseconds for the illustrative values chosen.

The square wave 32′ is differentiated by the circuit at 36′ thereby producing wave form 16′ which is applied to grid 16 of tube 10. The negative pip of wave form 16′, corresponding to the negative going portion of square wave 32′, drives grid 16 momentarily below cutoff and a second cycle is thereby initiated.

Returning to the square wave 22′, it is also applied to a network comprising the resistors 37 and 38 and capacitor 39, thereby producing at grid 46 the wave form 46′ which consists of an initial instantaneous voltage rise followed by a sloping voltage rise. The initial instantaneous voltage rise is determined primarily by the ratio of the resistances of resistors 37 and 38 and the slope is determined by the time constant of the total resistance of resistors 37 and 38 and the value of capacitor 39. The wave form 46′ is utilized to obtain that portion of the modulation voltage which produces the "dash" signal.

Tube 40 is a cathode follower which is used to mix the various wave forms previously discussed in the desired sequence and obtain a complex voltage output across its cathode output resistor 47, which output is then applied to the power oscillator, for instance, to the reflector of a klystron type tube, in order to obtain the desired frequency modulation characteristic in the transmitted output.

The square wave 32′, previously mentioned, is applied to grid 45 of tube 40. The average D. C. voltage level of grid 45 is determined by the bias supplied through switch 52 by potentiometer 55. In a similar manner, the setting of the potentiometer 51 through switch 53 determines the D. C. voltage bias of grid 46 and therefore the reference level of the "dash" wave form 46′ which is applied to grid 46.

Tube 50 is a D. C. restorer diode and restores the D. C. voltage level of grid 46 to the bias level of potentiometer 51.

Thus, it is seen that the sequence of wave forms producing the desired combined voltage wave form output 47′ across the cathode of resistor 47 of tube 40 is as follows:

Portion (A): The D. C. voltage level across resistor 47, as determined by the bias voltage settings of potentiometers 55 and 51, is maintained for the duration of the square wave 11′ as both grids 45 and 46 of tube 40 are at a fixed level during this period;

Portion (B): The sloping top square wave 46′ is then applied to grid 46 resulting in an initial sharp rise in cathode voltage followed by a slow rise due to the shape of this wave form;

Portion (C): The square wave 32′ is applied to grid 45 at the exact time that the sloping wave form 46′ is decreasing to its reference level. The amplitude of the (C) portion depends on the peak amplitude of square wave 32′ and the bias applied to grid 45. At the trailing edge of square wave 32′, the cathode of tube 40 again returns to the D. C. reference voltage determined by the bias applied to grid 46, and then the negative pip of wave form 16′, corresponding to the trailing edge of square wave 32′, initiates a new cycle.

As the frequency sequence of coded characters transmitted is determined by the relative voltage levels applied to the output stage, which may be a klystron type tube, this sequence may be determined by the settings of potentiometers 55 and 51. For the wave form just described, an "R" code is produced, as the voltage sequence is dot-dash-dot.

Figure 6:
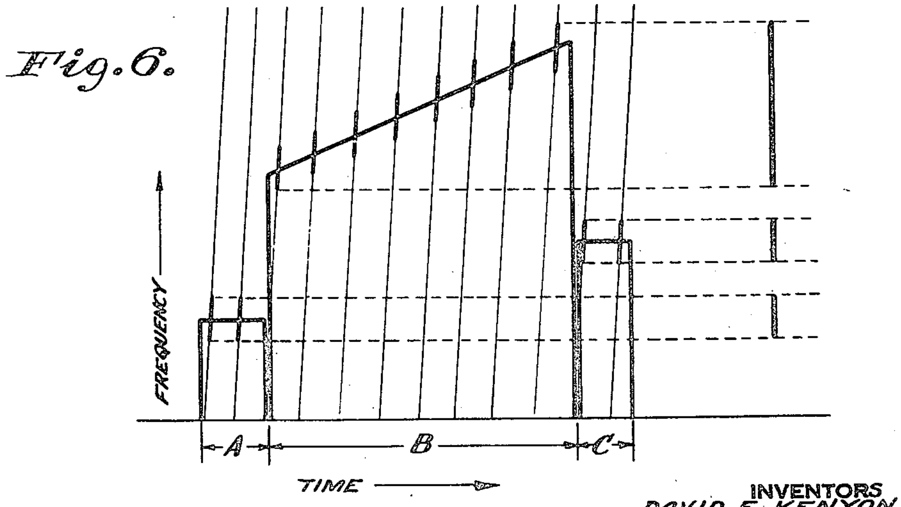
Fig. 6 is a chart illustrative of the operation of the invention.

Fig. 6 shows how a dot-dot-dash code may be obtained from the same circuit. Assume that switches 52 and 53 are thrown to the other potentiometers 54 and 56 and that their settings are such that the sloping top wave form 46′ is added to a low D. C. bias on grid 46 thus providing a high level "dash" wave form and the square wave 32′ is added to a medium D. C. bias on grid 45. The resulting code will then be dot-dot-dash or "U" code, as illustrated. Portions A, B and C are slightly separated to show how the combined wave form is composed of separate wave forms.

With the circuit shown, an "S" dot-dot-dot code can also be obtained by adjustment of resistor 37 such that a substantially flat-topped square wave is applied to grid 46 of tube 4. In this case, if the resistance of resistor 37 is made, say nine times greater than resistor 38, the initial rise of wave form 46′ will be practically the full rise and it will be practically a square wave. The modulating wave form will then contain three stepped voltage levels. The multivibrator time constants may be made adjustable so that these are of equal time duration.

If two rather than three characters are desired, this result can be obtained by adjustment of the potentiometer 54 or 55, such that the square wave applied to grid 45 does not reach a value above cutoff. A "dot-dot" or "dot-dash" can then be obtained by adjustment of resistor 37.

Codes of more than three characters may be obtained as follows. Successive dots may be generated by the addition in the "chain," of a multivibrator, a cathode follower mixer, and a D. C. restorer for each dot.

Successive dashes may be added in a similar manner by the use of a longer R. C. constant, an R. C. network for sloping the top, and an additional D. C. restorer and cathode follower mixer for each dash added.

The repetition rate is determined by the sum of the time intervals for each wave form in the sequence. For example, with the dot-dash-dot described, a dot square wave width of 3500 microseconds and a dash square wave width of 13,000 microseconds, the time per cycle will be 20,000 microseconds, which is a repetition rate of 50 cycles.

Figure 7:
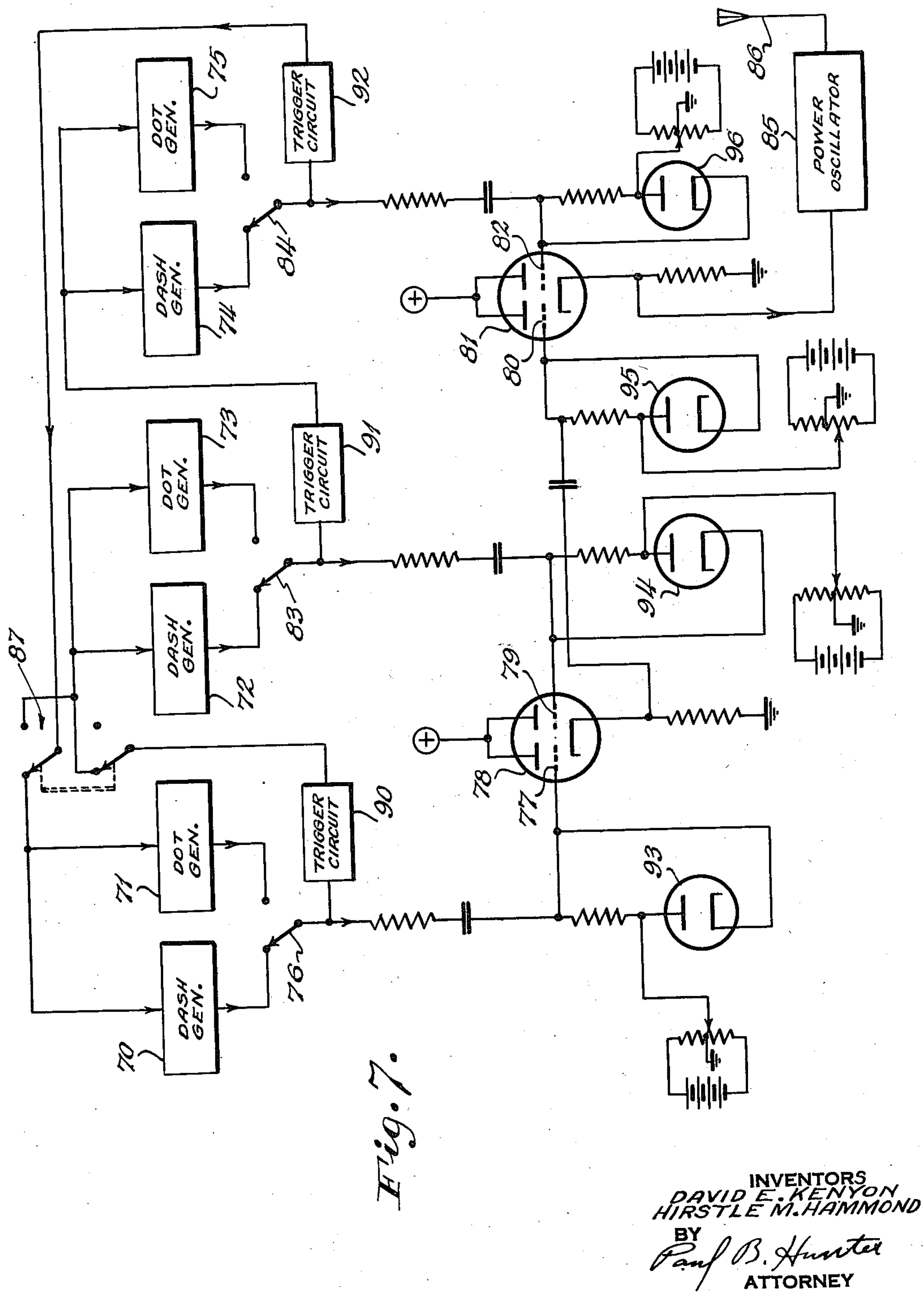
Fig. 7 is another embodiment of the invention.

Referring to Fig. 7 there is shown an embodiment of the invention which will provide any desired combination of characters, i. e., dots or dashes. This embodiment is designed to produce three character combinations or two character combinations but may easily be modified to produce single characters or more than three characters.

Referring to Fig. 2 for purposes of illustration, this apparatus may be considered as consisting of generators of three separate wave form portions such as A, B and C, of Fig. 2 each of which constitute a portion of the desired combined wave form. This embodiment of the invention provides a dot and a dash generator for each portion of the wave form, and a switch to select the desired generator. The dot generators may include multivibrators and the dash generators, sawtooth wave generators, as previously explained in connection with Fig. 4. One of the generators must comprise a free-running multivibrator to initiate the cycle. The combining means is shown in detail, and comprises two cathode follower tubes which combine separate portions in the same manner as previously described, to produce the desired wave form.

The operation is as follows. Portion A is provided either by dash generator 70 or dot generator 71 and the desired of these two outputs is selected by switch 76 and supplied to grid 77 of the cathode follower tube 78. At the end of the first portion of the wave form, a trigger voltage is supplied from the trigger circuit 90 to initiate portion B of the combined wave form by the operation of dash generator 72 and dot generator 73. The trigger circuit 90 may comprise a circuit adapted to differentiate the square wave output from dash generator 70 or dot generator 71.

Portion B of the wave form is provided by either dash generator 72 or dot generator 73 as selected by switch 83 and it is applied to the grid 79 of cathode follower tube 78. These two portions are combined in cathode follower tube 78 and their combined wave form is applied to grid 80 of cathode follower tube 81. At the end of portion B of the sequence, a trigger is supplied by trigger circuit 91 to dash generator 74 and dot generator 75.

Portion C of the wave form is supplied by either dash generator 74 or dot generator 75, as selected by switch 84 and it is applied to the grid 82 of cathode follower tube 81. Tube 81 combines portion C with the other two portions A and B and applies the complete wave form modulation to the power oscillator stage 85, which is adapted to have its frequency varied proportionately to the applied wave form and which transmits the variable frequency signals over antenna 86. Power oscillator 85 may be, for instance, a klystron type tube, having the frequency determining wave form applied to its reflector.

At the end of portion C, a trigger voltage is provided by trigger circuit 92 for the purpose of initiating a new cycle. This trigger voltage is connected by switch 87 to dash generator 70 and dot generator 71 if a three character combination is desired, or to dash generator 72 and dot generator 73 if a two character combination is desired. Thus, it is seen that the recurrence period is the sum of the individual wave form durations.

Diodes 93, 94, 95 and 96 are D. C. restorer diodes to quickly restore their associated grids to the proper bias level.

One of the generators 72, 73, 74 and 75 must be a free running multivibrator to initiate the cycle. Generators 70 and 71 should not be free running as they should have no output in the two-character position of switch 87.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Certain subject matter disclosed in this application related to beacon systems as in Fig. 1 is claimed in copending application S. N. 740,693, in the name of David E. Kenyon, filed April 10, 1947.

What is claimed is:

1. Means to transmit signals having a recurrent frequency sequence comprising a power oscillator, means to apply a modulation to said power oscillator, and means to vary said modulation to provide said recurrent frequency sequence, comprising a recurrence frequency oscillator, at least one dot generator, and at least one dash generator.

2. Means to transmit signals modulated by a recurrent frequency sequence, comprising an oscillator; means to apply a frequency modulation to said oscillator; means to vary said modulation to provide said recurrent frequency sequence, comprising a recurrence frequency oscillator, at least one sawtooth wave generator operable in response to said recurrence frequency oscillator and at least one rectangular wave generator operable in response to one of said sawtooth wave generators.

3. A transmitter adapted to transmit frequency modulated signals which are adapted to be received by panoramic receiving means, comprising a power output stage, a modulator adapted to shift the carrier frequency of said power output stage according to a predetermined modulation pattern, and wave forming circuits to generate said modulation pattern wave form, comprising recurrence frequency means, at least one sawtooth voltage generator, and at least one rectangular wave generator, operable in a predetermined sequence of at least three frequencies in response to said recurrence frequency means.

4. Means to automatically transmit frequency modulations representing recurrent codes of any combination of at least two characters including power output means, frequency modulating means adapted to modulate said power output means including multivibrator wave forming means.

5. Means to automatically transmit frequency modulations representing recurrent codes of any combination of at least two characters including power output means and frequency modulating means operatively connected to said power output means having at least one sawtooth wave generator and at least one rectangular wave generator.

6. Means to automatically transmit frequency modulations representing recurrent codes of any combination of at least two characters comprising power output means and frequency modulating means having at least one dot generator and at least one dash generator, and means to combine the outputs of said generators in any desired sequence.

7. Means to automatically transmit modulations representing recurrent codes of any combination of at least two characters comprising power output means, frequency modulating means having at least one sawtooth wave generator and at least one rectangular wave generator, and means to combine the outputs of said generators in the desired sequence comprising at least one cathode follower stage.

8. Means to transmit signals having a recurrent frequency sequence, comprising a power oscillator; means to apply a frequency modulation to said power oscillator; means to vary said modulation frequency according to said recurrent frequency sequence, comprising means to initiate the cycle of operation, means to create a wave form having at least one portion of definite slope, at least one portion of zero slope, said portions being separated by portions of substantially infinite slope including means to adjustably arrange the sequence of said portions.

9. Means to transmit signals having a recurrent frequency sequence comprising at least one multivibrator, at least one sawtooth voltage generator, operably connected to said multivibrator, combining means responsive to said multivibrator and said sawtooth voltage generator to provide a recurrent complex wave form, and power oscillator means adapted to be modulated in response to said complex wave form, to thereby transmit signals having said recurrent frequency sequence.

10. Means to generate signals having a recurrent frequency sequence comprising a free-running multivibrator, a sawtooth voltage generator operably connected to said multivibrator, means to combine the output wave forms of said multivibrator and said sawtooth voltage generator comprising a cathode follower having said separate output wave forms applied to its separate grids and having the resultant combined wave form output taken from its common cathode, and a generator of radiant energy adapted to be frequency modulated proportionally to said combined wave form.

11. Means to transmit signals having a predetermined frequency sequence, comprising a power oscillator adapted to be frequency modulated, frequency modulating means comprising a first multivibrator, a second multivibrator the input of which is operably connected to the output of said first multivibrator, a third multivibrator the input of which is operably connected to the output of said second multivibrator, a cathode follower tube of the type having two input grids, one of which is connected to the output plate of said second multivibrator, the other of which is connected to the output plate of said third multivibrator and the cathode output of which is operably connected to said power oscillator.

12. Means to transmit signals having a predetermined frequency sequence, comprising a power oscillator adapted to be frequency modulated, frequency modulating means comprising a first multivibrator, a second multivibrator the input of which is operably connected to the output of said first multivibrator, a third multivibrator the input of which is operably connected to the output of said second multivibrator, and the output of which is connected to the input of said first multivibrator at least one of said multivibrators being a free-running multivibrator, a cathode follower of the type having two input grids one of which is connected to the output of said second multivibrator through a long time constant circuit, the other of which is connected to the output plate of said third multivibrator and the cathode output of which is operably connected to said power oscillator.

13. Means to generate signals having a predetermined frequency sequence comprising a plurality of character generators adapted to produce wave forms of adjustable amplitude and duration, a power oscillator, and cathode follower combining means, the output of which is adapted to frequency modulate said power oscillator and the inputs of which are adjustably connected to the outputs of said character generators.

14. Means to generate frequency modulated signals of a recurrent sequence comprising a first character generator, a second character generator adapted to be triggered by said first character generator, time constant means to control the duration of the output wave forms of the character generators, cathode follower combining means, the input grids of which are connected to the outputs of said character generators and to separately adjustable bias sources, and a power oscillator, the input of which is connected to the output of said combining means and which is adapted to be frequency modulated proportionally to the input from said combining means to thereby provide said recurrent frequency sequence.

15. A modulator comprising a closed chain of character generators each consisting of a dot generator and a dash generator each member of said chain being adapted to trigger the succeeding member, first switching means adapted to separately choose either a dot or a dash output from each of said character generators, second switching means adapted to vary the number of members in the chain, and combining means the inputs of which are connected to the selectively switched outputs of said character generators.

16. A modulator comprising a closed chain of character generators each consisting of a dot generator and a dash generator each member of said chain being adapted to trigger the succeeding member, and at least one member comprising self-oscillating dot and dash generators, first switching means adapted to separately choose either a dot or a dash output from each of said members, second switching means adapted to vary the number of members in the chain, and cathode follower combining means, the inputs of which are connected to the outputs of said character generators through said first switching means.

17. A modulator comprising a closed chain of character generators each consisting of a dot generator and a dash generator each member of said chain being adapted to trigger the succeeding member, and at least one member comprising self-oscillating dot and dash generators, first switching means adapted to separately choose either a dot or a dash output from each of said members, second switching means adapted to vary the number of members in the chain, and cathode follower combining means, the input grids of which are connected to the outputs of said character generators, said grids being connected to separately adjustable bias sources by diode restoring circuits.

DAVID E. KENYON.
HIRSTLE M. HAMMOND.

REFERENCES CITED

The following references are of record in the file of this patent:

UNITED STATES PATENTS

| Number | Name | Date |
|---|---|---|
| 2,042,490 | Zahl | June 2, 1936 |
| 2,090,359 | Robinson | Aug. 17, 1937 |
| 2,289,987 | Norton | July 14, 1942 |
| 2,312,203 | Wallace | Feb. 23, 1943 |
| 2,338,395 | Bartelink | Jan. 4, 1944 |
| 2,368,448 | Cook | Jan. 30, 1945 |
| 2,378,604 | Wallace | June 19, 1945 |
| 2,380,959 | Frankel | Aug. 7, 1945 |
| 2,403,603 | Korn | July 9, 1946 |
| 2,416,327 | Labin | Feb. 25, 1947 |
| 2,420,516 | Bischoff | May 13, 1947 |
| 2,427,363 | Matte | Sept. 16, 1947 |
| 2,433,782 | Murdoch | Dec. 30, 1947 |